US010067249B2

(12) United States Patent
Srivastava et al.

(10) Patent No.: US 10,067,249 B2
(45) Date of Patent: Sep. 4, 2018

(54) DISPOSABLE RADIOCHEMISTRY DEVICE WITH RADIATION DOSE RECORDAL

(71) Applicant: GE Healthcare Limited, Buckinghamshire (GB)

(72) Inventors: Alok M. Srivastava, Niskayuna, NY (US); Victor Samper, Garching b. Munchen (DE); Stefan Riese, Muenster (DE)

(73) Assignee: GE Healthcare Limited, Buckinghamshire (GB)

( * ) Notice: Subject to any disclaimer, the term of this patent is extended or adjusted under 35 U.S.C. 154(b) by 459 days.

(21) Appl. No.: 14/653,907

(22) PCT Filed: Dec. 20, 2013

(86) PCT No.: PCT/EP2013/077639
§ 371 (c)(1),
(2) Date: Jun. 19, 2015

(87) PCT Pub. No.: WO2014/096337
PCT Pub. Date: Jun. 26, 2014

(65) Prior Publication Data
US 2015/0301204 A1    Oct. 22, 2015

(30) Foreign Application Priority Data
Dec. 21, 2012    (GB) .................................. 1223178.3

(51) Int. Cl.
*B01J 19/00*    (2006.01)
*B01J 19/24*    (2006.01)
(Continued)

(52) U.S. Cl.
CPC ............. *G01T 7/00* (2013.01); *B01J 19/0093* (2013.01); *G01T 1/10* (2013.01);
(Continued)

(58) Field of Classification Search
CPC .............................. B01J 19/00; B01J 19/0093; B01J 2219/0086; B01J 2219/0095–2219/00954;
(Continued)

(56) References Cited

U.S. PATENT DOCUMENTS

2005/0232387 A1    10/2005 Padgett et al.
2009/0036668 A1    2/2009 Elizarov et al.
(Continued)

FOREIGN PATENT DOCUMENTS

CN    1285919 C    11/2004
CN    101336114 A    12/2008
(Continued)

OTHER PUBLICATIONS

Vaille et al., Online Dosimetry Based on Optically Stimulated Luminescence Materials, Dec. 2005, IEEE Transactions on Nuclear Science, vol. 52, No. 6, pp. 2578-2582.*
(Continued)

*Primary Examiner* — Natasha E Young
(74) *Attorney, Agent, or Firm* — Dean D. Small; The Small Patent Law Group, LLC

(57) ABSTRACT

Radiation-sensitive material embedded in a disposable radiochemistry device gives the device the additional capability of recording radiation dose, for readout at a later time. There is provided a device comprising means for the introduction of a precursor compound, means for the introduction of a radionuclide, a reaction vessel for reacting said precursor compound and said suitable source of a radionuclide to obtain a radiolabelled compound, and one or more pieces of radiation-sensitive material embedded into said device wherein at least one of said pieces is positioned to be exposed to radioactivity associated with said radiolabelled compound.

18 Claims, 3 Drawing Sheets

(51) Int. Cl.
*G01T 1/10* (2006.01)
*G01T 7/00* (2006.01)

(52) U.S. Cl.
CPC .......... *B01J 2219/0086* (2013.01); *B01J 2219/00783* (2013.01); *B01J 2219/00822* (2013.01); *B01J 2219/00824* (2013.01); *B01J 2219/00828* (2013.01); *B01J 2219/00831* (2013.01); *B01J 2219/00833* (2013.01); *B01J 2219/00927* (2013.01); *B01J 2219/00954* (2013.01); *B01J 2219/00968* (2013.01)

(58) Field of Classification Search
CPC ......... B01J 2219/00968; B01J 2219/00; G01T 1/00; G01T 1/02; G01T 1/10; G01T 7/00
See application file for complete search history.

(56) References Cited

U.S. PATENT DOCUMENTS

| | | | |
|---|---|---|---|
| 2010/0302533 A1* | 12/2010 | Fehrenbacher | G01T 1/11 356/222 |
| 2011/0305618 A1 | 12/2011 | Graham et al. | |

FOREIGN PATENT DOCUMENTS

| | | | |
|---|---|---|---|
| EP | 2511006 | A2 | 10/2012 |
| JP | 60185730 | A | 9/1985 |
| JP | 2000292591 | A | 10/2000 |
| WO | 2003056359 | A1 | 7/2003 |
| WO | 2004093652 | A2 | 11/2004 |
| WO | 2008048921 | A2 | 4/2008 |
| WO | 2008140616 | A2 | 11/2008 |
| WO | 2011006166 | A1 | 1/2011 |
| WO | 2011044406 | A2 | 4/2011 |
| WO | 2011044474 | A1 | 4/2011 |

OTHER PUBLICATIONS

Wernli et al., Direct Ion Storage Dosimetry Systems for Photon, Beta and Neutron Radiation with Instant Readout Capabilities, 2001, Nuclear Technology Publishing, Radiation Protection Dosimetry, vol. 96, Nos. 1-3, pp. 255-259.*

English Translation of 1st Chinese Office Action and Search Report from corresponding Chinese Application No. 201380067245.X, dated May 3, 2016; 13 pages.

Portal, "Review of the Principal Materials Available for Thermoluminescent Dosimetry", Radiation Protection Dosimetry, vol. No. 17, pp. 351-357, 1986.

Gladstone et al, "A miniature Mosfet Radiation Dosimete Probe", Medical Physics, vol. No. 21, Issue No. 11, Nov. 1994.

Wernli et al., "A Novel Concept and Technique for Individual Monitoring for Photon, Beta and Neutron Radiation", 11th International Congress of the International Radiation Protection Association, Madrid, Spain, May 23-28, 2004.

Ponte et al., "A Catalogue of Dosemeters and Dosimetric Services Within Europe—An Update", Radiation Protection Dosimetry, vol. No. 112, Issue No. 1, pp. 45-68, 2004.

PCT Search Report and Written Opinion issued in connection with corresponding PCT Application No. PCT/EP2013/077639 dated Apr. 3, 2014.

GB Search Report issued in connection with corresponding GB Application No. 1223178.3 dated Jun. 3, 2015.

"Comparing Radiation Detectors and Dosimeters:TLD-OSL-FiLM-ION-STOARAGE", Jun. 20, 2012, retrieved from "http://www.rockyflatsgear.com/Comparing-radiation-detectors-and-dosimeters-TLD-OSL-FiLM-ION-STOARAGE.html", version recorded by Web Archive on Nov. 2, 2012, retrieved from "http://web.archive.org/web/20121102015503/http://www.rockyflatsgear.com/Comparing-radiation-detectors-and-dosimeters-TLD-OSL-FiLM-ION-STOARAGE.html" on Sep. 9, 2015.

Machine translation and Office Action issued in connection with corresponding JP Application No. 2015-548627 dated Sep. 5, 2017.

* cited by examiner

DISPOSABLE RADIOCHEMISTRY DEVICE WITH RADIATION DOSE RECORDAL

CROSS-REFERENCE

This application is a national stage application claiming priority to PCT/GB2013/0177639, published as WO2014/096338 and filed on Dec. 20, 2013, which claims priority to Great Britain Patent Application Serial No. GB 1223178.3, filed on Dec. 21, 2012.

TECHNICAL FIELD OF THE INVENTION

Embodiments of the present invention relate to the field of radiolabelled compounds. More specifically, embodiments of the present invention relate to the production of radiolabelled compounds. Radiolabelled compounds obtained by embodiments of the present invention are suitable for in vivo imaging, and in particular positron emission tomography (PET) imaging.

DESCRIPTION OF RELATED ART

In the synthesis of radiolabelled compounds, as compared with manual techniques, automated techniques allow reduced operator exposure to radiation, shorter reaction times, better control of reaction conditions and reduced reagent consumption.

Positron emission tomography (PET) is a nuclear medical imaging technique that produces a three-dimensional image or picture of functional processes in the body. The system detects pairs of photons emitted indirectly by a PET tracer comprising a biologically active molecule and at least one positron-emitting radionuclide. Given the short half-life of the positron-emitting radionuclides used in PET tracers, the advantages presented by automated synthesis techniques are clear. Typically, the automated synthesis of a PET tracer is carried out on a disposable device such as a cassette or microchip with the synthesis process being driven by associated hardware and software.

Radioactivity in the synthesis of radiolabelled compounds is typically present in low concentration relative to the overall volume of the substance that comes together with the radioactivity. Taking $^{18}F$ produced from $[^{18}O]H^2O$ as an example, a variation in $^{18}F$ concentration of 2 orders of magnitude is easily possible without increasing the volume of $[^{18}O]H^2O$, meaning that in an $^{18}F$-labelled PET tracer preparation the same volume of water could contain activity for 1 or 100 PET scans. Therefore, a disposable device supplied to a producer of a radiopharmaceutical, such as a kit for $[^{18}F]$-fluorodeoxyglucose ($[^{18}F]FDG$), could be used to synthesise one or many doses depending on the concentration of activity used in the synthesis.

Another distinctive feature of radiosynthesis processes is that the radioactivity is constantly decaying with time. Therefore, for the same patient dose of a PET tracer, a different quantity of the radioactive product is required at the end-of-synthesis time as compared with a time later in the day after the end of synthesis.

Because disposable devices for the production of PET tracers are sold at a fixed price, some customers are either paying too much or too little for the actual number of doses obtained. A scheme where customers pay for the number of doses synthesised, rather than paying a fixed price only for the disposable device itself has the advantage that the customer pays for what is used rather than a fixed price that may not be reflective of what is used.

There is therefore a need for a reliable method that would allow for measurement of the number of doses of a PET tracer actually synthesised.

SUMMARY OF THE INVENTION

Embodiments of the present invention uses the concept that radiation-sensitive material embedded in a disposable radiochemistry device gives the device the additional capability of recording radiation dose, for readout at a later time. Embodiments of the present invention allow for the measurement of the actual amount of radiolabelled compound produced by a disposable radiochemistry device, with the advantage that charging can be related to compound produced rather than number of devices.

In an embodiment, there is provided a device comprising means for the introduction of a precursor compound, means for the introduction of a radionuclide, a reaction vessel for reacting said precursor compound and said suitable source of a radionuclide to obtain a radiolabelled compound, and one or more pieces of radiation-sensitive material embedded into said device wherein at least one of said pieces is positioned to be exposed to radioactivity associated with said radiolabelled compound.

In an embodiment, there is provided a method comprising providing a device comprising means for the introduction of a precursor compound, means for the introduction of a radionuclide, and a reaction vessel for reacting said precursor compound and said suitable source of a radionuclide to obtain a radiolabelled compound, synthesising a radiolabelled compound on said device, and exposing the radiation dose associated with said radiolabelled compound to said at least one piece of radiation-sensitive material comprised in said device.

DETAILED DESCRIPTION

In one aspect, the present invention provides a device comprising:
  (i) means for the introduction of a precursor compound;
  (ii) means for the introduction of a radionuclide;
  (iii) a reaction vessel for reacting said precursor compound and said radionuclide to obtain a radiolabelled compound; and, (iv) one or more pieces of radiation-sensitive material embedded into said device wherein at least one of said pieces is positioned to be exposed to radioactivity associated with said radiolabelled compound.

A "device" in the context of embodiments of the present invention is suitably a disposable device designed to be suitable for radiopharmaceutical manufacture and therefore manufactured from materials, generally polymers, which are of pharmaceutical grade and ideally also resistant to radiolysis. A suitable such device may be a microfabricated device or a cassette for use with automated synthesisers.

Figure 1:
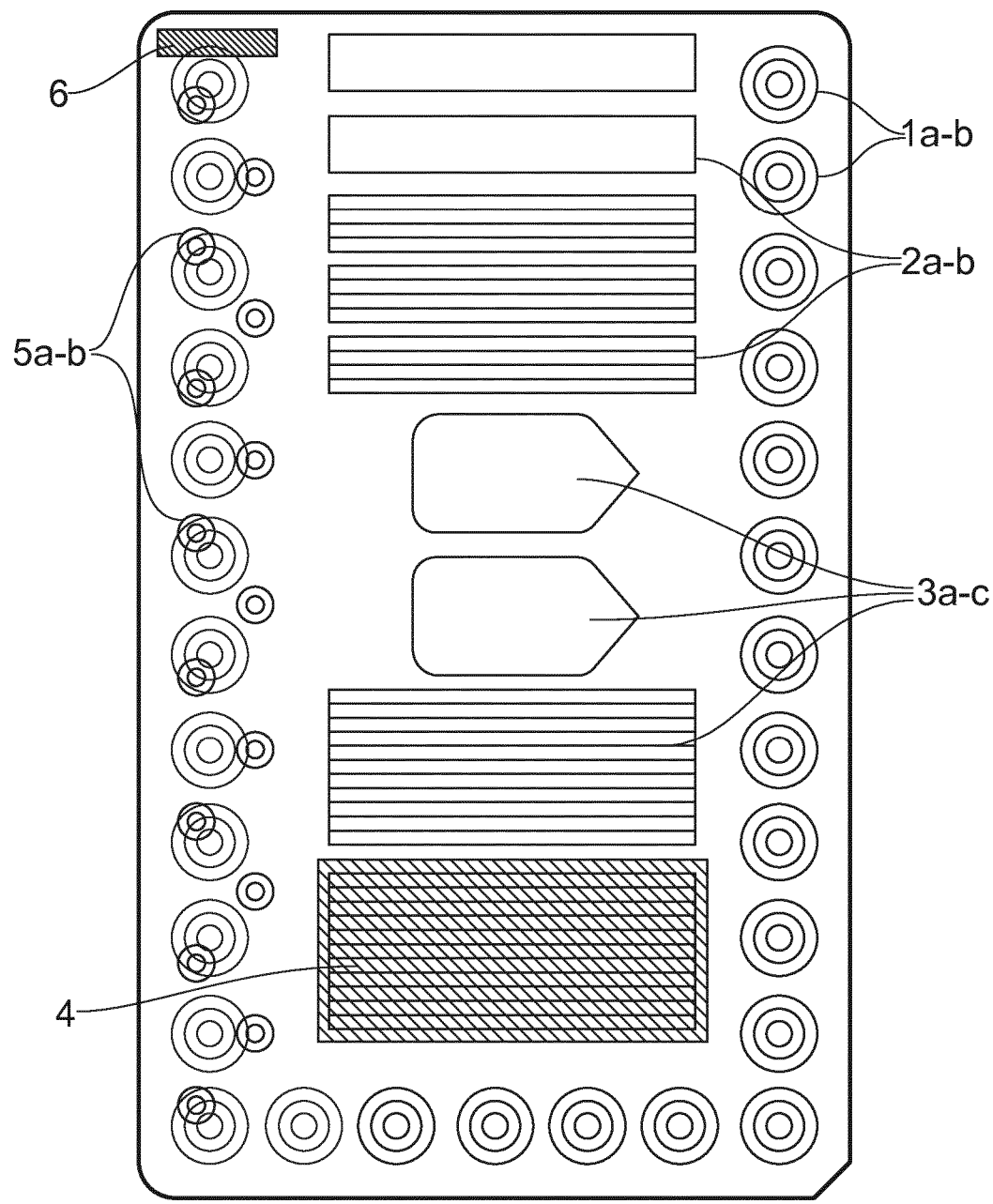
FIG. 1 is a top view of a microsynthesis chip, which is a device according to an embodiment of the present invention. 1a-b represent valves, 2a-b represent pre-processing elements, 3a-c are reactors, 4 is the synthesis activity measuring region comprising radiation-sensitive material, which may also be a reactor or a dedicated activity measuring zone, 5a-b are fluid connectors and 6 is a calibration or reference region of the type described herein to ensure accurate measurement of activity related to compound synthesised, e.g. comprising a piece of radiation-sensitive material which is pre-exposed to a set amount of activity prior to use of the chip.
Figure 2:
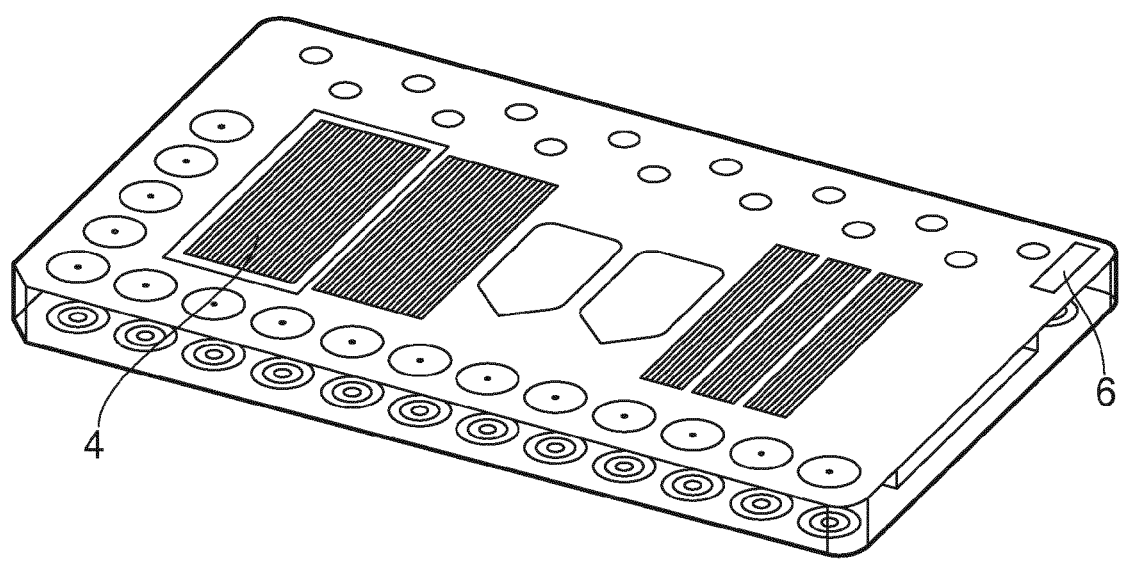
FIG. 2 is the same microsynthesis chip as FIG. 1 shown from a different angle with features 4 and 6 highlighted.

A "microfabricated device", also commonly referred to as a "microsynthsiser card" or "microsynthsiser chip" (and herein may simply be referred to as a "card" or a "chip") is a device in which predetermined networks of microchannels or capillaries, typically 10-300 μm, more typically 50-300 μm in diameter, are etched or otherwise machined or formed in or on the surface of a substrate, suitably made of ceramic or glass or silicon or polymer. Alternatively, the microchannels may be created using polydimethylsiloxane, which may be poured over a master (usually glass), allowed to cure and then peeled off, or are fabricated by injection moulding, hot embossing, casting, lithography, or machining. These channels may be sealed through bonding of a cover plate, suitably made from a metal (for example, gold, platinum or silver) or, more commonly, glass, to create a contained network capable of manipulating picoliter to microliter volumes of liquid or gas. The sealing method used depends on the materials selected and may be selected from thermal bonding (for glass chips), anodic bonding (for silicon-glass chips), and for polymer chips the sealing method may be selected from clamping, gluing, application of heat and pressure, and natural adhesion. Nanoliter and picoliter volumes may be used for analytical aspects but the devices can handle flows of up to hundreds of microliters per minute. This could be increased further, for example, by stacking multiple devices. These devices are designed to be used either with syringe pumps (available from Kloehen Limited, Las Vegas, USA) or under electroosmotic flow or pressure driven flow or capillary force driven flow or electrowetting. Fused silica capillaries or steel appropriately sized metal or polymer tubing or a custom manifold can be used for interfacing with reagents or reagent sources and analytical systems (such as ultraviolet (UV), capillary electrophoresis (CE), capillary electrochromatography (CEC), electrochemical, refractive index, and radioactivity detectors). The reader is referred for more detail to "Fundamentals And Applications of Microfluidics" by Nam-Trung Nguyen (2nd Edition 2006 Artech House Inc.) and to "Micromachined Transducers Sourcebook" by Gregory T. A. Kovacs (1998 McGraw-Hill Companies Inc.). FIG. 1 illustrates the layout of a typical microfabricated device suitable for radiosynthesis, with all apart from features 4 and 6 being features of a known device.

Figure 3:
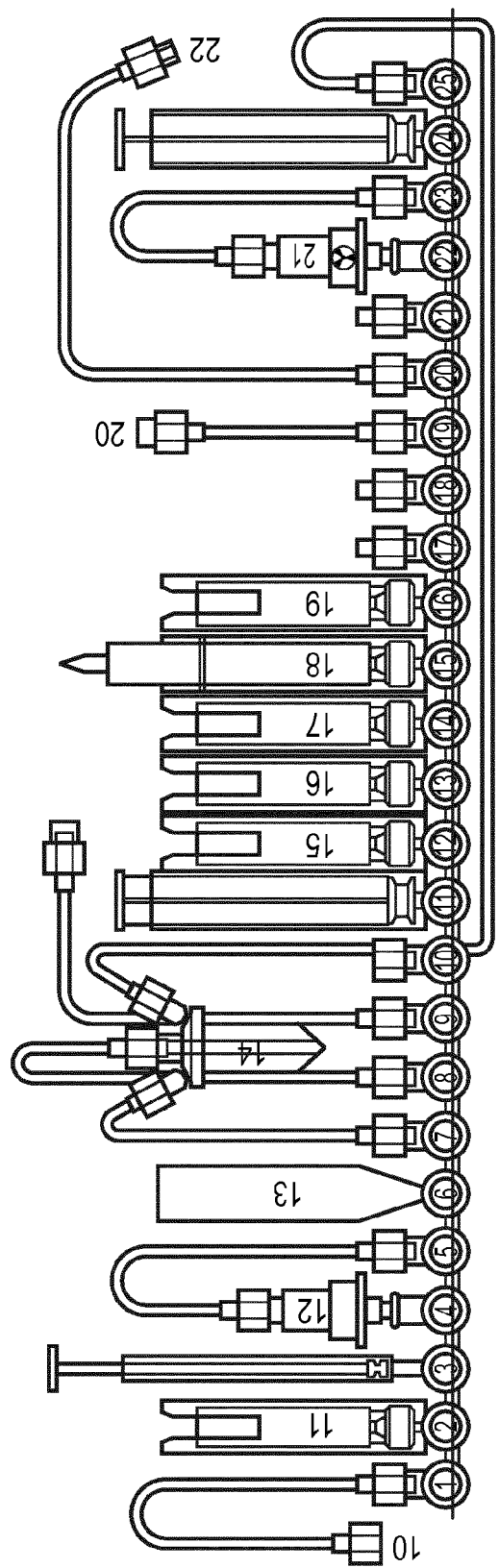
FIG. 3 illustrates a typical FASTlab™ cassette, which can be easily adapted to be a device of an embodiment of the present invention by incorporation of a piece of radiation-sensitive material close to the product collection outlet (labelled as "Product" the figure).

A "cassette" as referred to herein is a piece of apparatus designed to fit removably and interchangeably onto an automated synthesis apparatus, in such a way that mechanical movement of moving parts of the synthesizer controls the operation of the cassette from outside the cassette, i.e. externally. A typical cassette comprises a linear array or other arrangement of valves, each linked to a port where reagents or vials can be attached, by either needle puncture of an inverted septum-sealed vial, or by gas-tight, marrying joints. Each valve has a male-female joint which interfaces with a corresponding moving arm of the automated synthesis apparatus. External rotation of the arm thus controls the opening or closing of the valve when the cassette is attached to the automated synthesis apparatus. Additional moving parts of the automated synthesis apparatus are designed to clip onto syringe plunger tips, and thus raise or depress syringe barrels. The cassette is versatile, typically having several positions where reagents can be attached, and several suitable for attachment of syringe vials of reagents or chromatography cartridges (e.g. for solid phase extraction). The cassette always comprises a reaction vessel, typically having a volume of 0.5 to 10 mL. Tubing links the components together to allow passage of reagents and reaction mixture sequentially through the cassette. Automated synthesiser apparatus are commercially available from a range of suppliers including: GE Healthcare; CTI Inc; Ion Beam Applications S.A. (Chemin du Cyclotron 3, B-1348 Louvain-La-Neuve, Belgium); Raytest (Germany) and Bioscan (USA), Trasis (Liege, Belgium), Ora (B-5600 Philippeville, Belgium). FIG. 3 illustrates the layout of a typical cassette for use with an automated synthesis apparatus.

The term "means for introduction of" refers for example to the microchannels or capillaries of a microfabricated device, or to the tubing of a cassette, which lead to a vessel (loop in the microfabricated device or vial on the cassette) into which the relevant reactant is stored or reacted. Alternatively such means may be a vial that can be attached to or is attached to a cassette. In one embodiment, said precursor compound is comprised in said device.

A "precursor compound" comprises a derivative of a radiolabelled compound, designed so that a chemical reaction with a convenient chemical form of a radionuclide occurs site-specifically; can be conducted in the minimum number of steps (ideally a single step); and without the need for significant purification (ideally no further purification), to give the desired radiolabelled compound. Such precursor compounds are synthetic and can conveniently be obtained in good chemical purity. The precursor compound may optionally comprise a protecting group for certain functional groups of the precursor compound. Protecting groups are described in 'Protective Groups in Organic Synthesis', Theorodora W. Greene and Peter G. M. Wuts, (Fourth Edition, John Wiley & Sons, 2006). There are many examples of known precursor compounds, as described in Handbook of Radiopharmaceuticals (2003 John Wiley & Sons, Ltd., Welch and Redvanly, Eds.).

A "radionuclide" (also referred to as "radioactive isotopes" or "radioisotopes") is an atom with an unstable nucleus, characterised by excess energy available to be imparted either to a newly created radiation particle within the nucleus or via internal conversion. During this process, the radionuclide undergoes radioactive decay, resulting in the emission of gamma ray(s) and/or subatomic particles such as alpha or beta particles. These emissions constitute ionizing radiation. Radionuclides with suitable half-lives play an important part in a number of technologies, e.g. in nuclear medicine. In an embodiment, the radionuclides are those suitable for in vivo imaging, i.e. capable of being detected externally following administration to a subject being imaged. Examples of radionuclides suitable for in vivo imaging include radioactive metal ions (e.g. positron emitter such as $^{64}$Cu, $^{48}$V, $^{52}$Fe, $^{55}$Co, $^{94m}$Tc $^{89}$Zr; or gamma-emitters such as $^{99m}$Tc, $^{111}$In, $^{113m}$In, or $^{67}$Ga), gamma-emitting radioactive halogens (e.g. $^{123}$I, $^{131}$I, or $^{77}$Br) and poistron-emitting radioactive non-metals (e.g. $^{11}$C, $^{13}$N, $^{15}$O, $^{17}$F, or Br) and positron-emitting radioactive non-metals (e.g. $^{11}$C, $^{13}$N, $^{15}$O, $^{17}$F, $^{18}$F, $^{75}$Br, $^{76}$Br or $^{124}$I). In an embodiment, the radionuclide is a positron-emitter. In an embodiment, the positron-emitter is $^{89}$Zr, $^{68}$Ga, $^{11}$C or $^{18}$F, more particularly $^{68}$Ga, $^{11}$C or $^{18}$F, and more particularly $^{68}$Ga or $^{18}$F.

A suitable "radiation-sensitive material" in the context of embodiments of the present invention is one that can record radiation dose for read out at a later time. Furthermore, it must be possible to embed the radiation-sensitive material into a device as defined herein above. The term "embedded" refers to the secure incorporation of one or more pieces of radiation-sensitive material into the structure of the device of an embodiment of the invention so that it forms part of said device but does not interfere with the normal functioning of said device. The one or more pieces of radiation-sensitive material must be located to permit exposure to radiation from the radiolabelled compound being synthesised, but to as little an extent as possible radiation from the radionuclide prior to formation of the radiolabelled compound.

In one embodiment, said one or more pieces of radiation-sensitive material comprises a thermoluminescence (TL) material. TL is an established method for personal dosimetry, as described by Portal (Rad Prot Dos 1986; 17: 351-357) along with other such methods. "TL materials" are low-cost, inorganic polycrystalline materials that can easily be embedded into polymer material typically used in suitable devices of embodiments of the invention as described hereinabove. Luminescence occurs when the card is heated, which makes readings easy to carry out but also means that care needs to be taken not to inadvertently expose the material to heat prior to read-out. The device of an embodiment of the invention can be engineered to have various trap depths. These traps can release charge at a variety of temperatures from 100° C.-500° C. (or alternatively the charge can be released by exposure to light), resulting in luminescence. The radiation dose, that the material has been exposed to can be measured by heating the material and counting the photons that are emitted during thermally induced decay of exited metastable electronic states in the material. Commercially available read-out devices for TL dosimeters could be used for this purpose. Examples of known TL materials include those comprising aluminium oxide ($Al_2O_3$), beryllium oxide (BeO), calcium fluoride ($CaF_2$), lithium fluoride (LiF), calcium sulfate ($CaSO_4$), lithium borate ($Li_2B_4O_7$), calcium borate ($Ca_3(BO_3)_2$), magnesium borate ($MgB_4O_7$), potassium bromide (KBr) or feldspar ($KAlSi_3O_8$—$NaAlSi_3O_8$—$CaAl_2Si_2O_8$). In an embodiment, the TL material comprises $CaF_2$, $Li_2B_4O_7$, $Al_2O_3$, $CaSO_2$ or LiF, more particularly LiF, e.g. LiF:Mg,Ti or LiF:Mg,Cu,P.

In another embodiment said one or more pieces of radiation-sensitive material comprises a direct ion-storage (DIS) dosimeter measures radiation by absorbing charges into a miniature (MOSFET) ion chamber. The dosimeter can be instantaneously processed and read by an internal USB based reader. The process only takes a few moments to read and record the results. Exposure to gamma, X-ray and beta radiation can be measured using this technology and instant and unlimited readouts are possible. Accumulated dose is not affected by the readout process. The dosimeter is small, durable and water resistant, as well as moderately priced.

In a further embodiment, said one or more pieces of radiation-sensitive material comprises an optically-stimulated lumine (OSL) sensor. OSL sensors only require an optical path whereby a stimulating beam of light can illuminate the OSL sensor(s) and the resultant radiation induced luminescence can be routed back through the same or alternate optical path to a light detector such as a photomultiplier tube that quantifies the amount of luminescent light. In one embodiment, the invention employs an optical path whereby an external beam of light can enter the interior of the holder, illuminate each OSL sensor and enable the luminescent light to exit the holder along the same optical path without need to remove the sensors from their normal position with respect to any filters or converting materials. The optical path may be either an optical fibre or an uninterrupted air channel through which light can travel. Dose is read from measuring return optical signal under laser illumination.

The radiation dose of each used device can be either read by the user or sent to another party to read out the radiation dose. Where the radiation dose is read someone other than the user of the device, in an embodiment, the device is set up to ensure that the measurement accurately reflects radiation dose due to radiolabelled compound synthesised by the device. So, for example, where the radiation-sensitive material is a TL material exposing the material to an elevated temperature (sometimes referred to as "fading") can result in an erroneous reading. Alternatively, an erroneous reading that is too low could result if the path between the radioactivity emitted by the radiolabelled compound is somehow blocked. The device of an embodiment of the invention is therefore configured to ensure an accurate reading.

Where the radiation-sensitive material is a TL material, the following configurations are possible:

a) The device as defined hereinabove comprising a further piece of radiation-sensitive material that has been exposed to a calibrated dose of radiation prior to use of said device and wherein said further piece of radiation-sensitive material positioned to be exposed to as little radioactivity associated with said radiolabelled compound as possible. A first piece of TL material can be arranged in such a way that it is shielded from all or substantially all activity associated with the synthesis. For example, the TL material could be shielded using an appropriately-located piece of lead shielding, or alternatively could be located off to one side of the device where it is exposed to synthesis activity through a very small solid angle. The piece off to the side would be pre-exposed to a calibrated dose by the device producer before shipping and then becomes an indication for an erroneous reading since its trapped charge would be mostly what was pre-programmed into it (given the small solid angle interaction with the synthesised activity). There may additionally be a second piece located so that it sees 50% of synthesis activity (e.g. on one of the 2 large flat faces of a microsynthesis card). In this case, measuring both pieces and comparing with the known pre-programmed value gives both the dose and a signal that represents the credibility of the dose signal.

b) Alternatively, a TL material could be used with a trap release temperature higher than the transition temperature of at least part of the device material, meaning that dose read out results in a permanent deformation of a feature on the device substrate. The phrase "at least part of" can encompass wherein said device material having a lower trap release temperature than the TL material is a piece of material embedded into said device, or may comprise substantially all of the material from which the device is made.

c) Furthermore, information can be extracted from calibration curves of the TL material e.g. this is commonly used to "date" devices, using the ratio of a low-energy thermal trap to that of a high energy trap.

In another aspect, the present invention provides a method comprising:
(i) providing a device as defined hereinabove;
(ii) synthesising a radiolabelled compound on said device; and
(iii) exposing the radiation dose associated with said radiolabelled compound to said at least one piece of radiation-sensitive material comprised in said device.

The devices presented according to embodiments of the invention are equally applicable to the method according to embodiments of the invention.

What is claimed is:

1. A device comprising:
   a reaction vessel for reacting a precursor compound and a suitable source of a radionuclide to obtain a radiolabelled compound; and
   one or more pieces of radiation-sensitive material embedded into the reaction vessel, wherein at least one of said pieces is positioned to be exposed to radioactivity associated with said radiolabelled compound, wherein the one or more pieces of radiation-sensitive material comprise a thermoluminescence material, wherein the thermoluminescence material comprises aluminum oxide ($Al_2O_3$), beryllium oxide (BeO), calcium fluoride (CaF2), lithium fluoride (LiF), calcium sulfate ($CaSO_4$), lithium borate ($Li_2B_4O_7$), calcium borate ($Ca_3(BO_3)_2$), magnesium borate ($MgB_4O_7$), potassium bromide (KBr) or feldspar ($KAlSi_3O_8$—$NaAlSi_3O_8$—$CaAl_2Si_2O_8$).

2. The device as defined in claim 1, wherein the radionuclide is a positron-emitter.

3. The device as defined in claim 1, wherein the radionuclide is $^{89}Zr$, $^{68}Ga$, $^{11}C$ or $^{18}F$.

4. The device as defined in claim 1, wherein the radionuclide is $^{68}Ga$, $^{11}C$ or $^{18}F$.

5. The device as defined in claim 1, wherein the precursor compound is comprised in said device.

6. The device as defined in claim 1, wherein the reaction vessel is a cassette for use with an automated synthesis device.

7. The device as defined in claim 1, wherein the reaction vessel is a chip for use with a microfluidic synthesizer.

8. The device as defined in claim 1, wherein the one or more pieces of radiation-sensitive material comprises an optically-stimulated lumine sensor.

9. The device as defined in claim 1, wherein the one or more pieces of radiation-sensitive material comprises a direct ion-storage dosimeter.

10. The device as defined in claim 1, wherein the thermoluminescence material comprises $CaF_2$, $Li_2B_4O_7$, $Al_2O_3$, $CaSO_2$ or LiF.

11. The device as defined in claim 1, wherein the thermoluminescence material comprises LiF.

12. The device as defined in claim 11, wherein the thermoluminescence material comprises LiF:Mg, Ti or LiF:Mg,Cu,P.

13. The device as defined in claim 1, further comprising a further piece of radiation-sensitive material comprising the thermoluminescence material that has been exposed to a calibrated dose of radiation prior to use of said device and wherein said further piece of radiation-sensitive material positioned to be exposed to as little radioactivity associated with said radiolabelled compound as possible.

14. The device as defined in claim 1, wherein the one or more pieces of radiation-sensitive material comprises the thermoluminescence material with a trap release temperature higher than the transition temperature of at least part of the device material.

15. The device as defined in claim 1, wherein at least one of the one or more pieces of radiation-sensitive material is exposed to radioactivity associated with said radiolabelled compound dispensed from said device.

16. The device as defined in claim 1, further comprising a microfabricated device comprising a network of microchannels.

17. A method, comprising:
   providing a device comprising:
      a reaction vessel for reacting a precursor compound and a suitable source of a radionuclide to obtain a radiolabelled compound; and,
      one or more pieces of radiation-sensitive material embedded into the reaction vessel, wherein the one or more pieces of radiation-sensitive material comprise a thermoluminescence material, the thermoluminescence material comprises aluminum oxide ($Al_2O_3$), beryllium oxide (BeO), calcium fluoride (CaF2), lithium fluoride (LiF), calcium sulfate ($CaSO_4$), lithium borate ($Li_2B_4O_7$), calcium borate ($Ca_3(BO_3)_2$), magnesium borate ($MgB_4O_7$), potassium bromide (KBr) or feldspar ($KAlSi_3O_8$—$NaAlSi_3O_8$—$CaAl_2Si_2O_8$);
   synthesising a radiolabelled compound on the reaction vessel; and
   exposing a radiation dose associated with the radiolabelled compound to the radiation-sensitive material comprised in the reaction vessel.

18. The method of claim 17, wherein the thermoluminescence material comprises $CaF_2$, $Li_2B_4O_7$, $Al_2O_3$, $CaSO_2$, or LiF.

* * * * *